US012688954B2

(12) United States Patent
Good et al.

(10) Patent No.: US 12,688,954 B2
(45) Date of Patent: Jul. 21, 2026

(54) LAYERED PROFILE INSULATION

(71) Applicant: Leviton Manufacturing Co., Inc., Melville, NY (US)

(72) Inventors: Paul Michael Good, New Holland, PA (US); Bradley G. Hess, Sinking Spring, PA (US); Antoine Cotard, Lancaster, PA (US)

(73) Assignee: LEVITON MANUFACTURING CO., INC., Melville, NY (US)

(*) Notice: Subject to any disclaimer, the term of this patent is extended or adjusted under 35 U.S.C. 154(b) by 107 days.

(21) Appl. No.: 18/508,365

(22) Filed: Nov. 14, 2023

(65) Prior Publication Data

US 2025/0157700 A1 May 15, 2025

(51) Int. Cl.

*H01B 11/02* (2006.01)
*H01B 13/14* (2006.01)
*H01B 17/56* (2006.01)

(52) U.S. Cl.

CPC ............. *H01B 17/56* (2013.01); *H01B 11/02* (2013.01); *H01B 13/141* (2013.01)

(58) Field of Classification Search

CPC .......... H01B 3/30; H01B 7/02; H01B 7/0275; H01B 7/18; H01B 7/185; H01B 7/189; H01B 7/34; H01B 11/02; H01B 11/18; H01B 13/14; H01B 13/141; H01B 13/143; H01B 17/56

USPC ....... 174/110 R–120 SR; 264/505, 506, 507, 264/508, 571

See application file for complete search history.

(56) References Cited

U.S. PATENT DOCUMENTS 2,583,025 A * 1/1952 Swift ..................... H01B 7/182 174/117 R
2,583,026 A * 1/1952 Swift ..................... H01B 7/188 264/171.18
5,990,419 A * 11/1999 Bogese, II ............. H01B 7/184 174/120 SR
6,787,694 B1 * 9/2004 Vexler .................... H01B 11/02 174/27
6,914,193 B2 * 7/2005 Ware .................... H01B 7/2825 174/113 R
7,015,398 B2 * 3/2006 Vexler .................... H01B 3/441 174/121 A
7,271,344 B1 * 9/2007 Stutzman ............... H01B 11/04 174/113 R
7,473,848 B2 * 1/2009 Kenny ................... H01B 11/04 174/120 C
7,476,809 B2 * 1/2009 Magner .................... H01B 7/32 174/120 R
7,560,646 B2 7/2009 Heffner
7,795,531 B2 * 9/2010 Abe ........................... C08J 9/04 174/120 R
7,795,539 B2 * 9/2010 Thuot .................. H01B 7/0275 174/113 R (Continued)

OTHER PUBLICATIONS

International Search Report and Written Opinion received for PCT Application Serial No. PCT/US2024/053349 dated Feb. 6, 2025, 8 pages.

*Primary Examiner* — William H. Mayo, III

(74) *Attorney, Agent, or Firm* — Amin, Turocy & Watson, LLP

(57) ABSTRACT

A conductor of a twisted-pair data cable has a primary profiled insulation layer formed over a conductive wire, and a second insulation layer formed over the primary profiled insulation layer.

20 Claims, 12 Drawing Sheets

(56) References Cited

U.S. PATENT DOCUMENTS

| | | | | |
|---|---|---|---|---|
| 7,993,568 | B2 * | 8/2011 | Heffner | H01B 13/14 264/505 |
| 9,368,258 | B2 * | 6/2016 | Heffner | H01B 13/143 |
| 11,081,257 | B2 | 8/2021 | Kaczmarski et al. | |
| 2005/0045368 | A1 * | 3/2005 | Keogh | H01B 3/446 174/120 R |
| 2006/0021772 | A1 * | 2/2006 | Dellagala | H01B 11/002 174/27 |
| 2006/0207786 | A1 * | 9/2006 | Clark | H01B 11/002 174/110 R |
| 2009/0233052 | A1 * | 9/2009 | Thuot | H01B 3/30 425/461 |
| 2010/0276178 | A1 | 11/2010 | Keller et al. | |

* cited by examiner

LAYERED PROFILE INSULATION

TECHNICAL FIELD

The disclosed subject matter relates generally to data cabling.

BACKGROUND

Many types of data cables, including category-rated cables such as local area network (LAN) cables, carry multiple twisted wire conductive pairs so that multiple data signals can be routed via a single cable. When designing and manufacturing a twisted-pair cable, a center-to-center distance between the conductors of a given conductor pair that yields a desired impedance or dielectric constant is determined, and this center-to-center distance should be maintained across the length of the cable. The electrical and transmission characteristics of each conductor pair can also be tuned by designing air space around the conductors, which can be achieved using a profiled insulation layers surrounding the twisted wire conductive pairs.

The foregoing is merely intended to provide an overview of data cable design considerations relevant to the solutions described herein. Problems with the state of the art, and corresponding benefits of some of the various non-limiting embodiments described herein, may become further apparent upon review of the following detailed description.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Various embodiments described herein provide a data cable design that maintains a consistent volume of air space around the conductors of each of the cable's twisted pairs across the length of the cable, in part by preventing nesting of adjacent conductors when profiled insulation is used. In one or more embodiments, an additional layer of insulation is added to the primary profiled insulation that surrounds each conductive wire, preventing nesting of adjacent profiled insulators and ensuring a consistent center-to-center distance between the conducive wires of the twisted pair. These two layers of insulation can be applied via a co-extrusion method using a single crosshead for two or more layers of insulation.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

DETAILED DESCRIPTION

Figure 1:
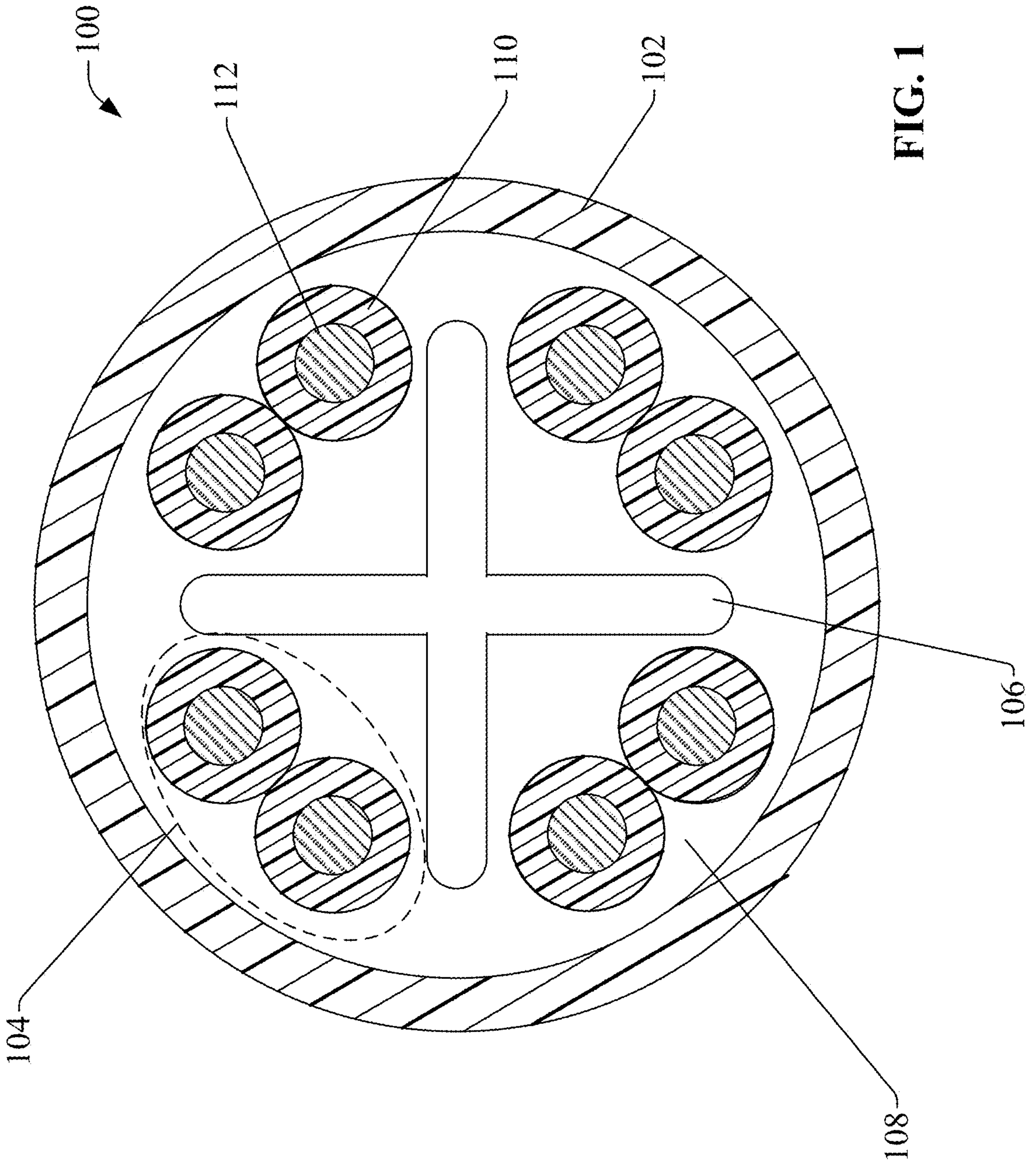
FIG. 1 is a cross-sectional view of an example category cable containing four twisted pairs of electrical conductors.

The subject disclosure is now described with reference to the drawings wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

FIG. 1 is a cross-sectional view of an example category cable 100 (e.g., a LAN cable or other such data cable) containing four twisted pairs 104 of insulated conductors. The jacket 102 of cable 100 houses the four twisted pairs 104 as well as an elongated cross member 106 that extends through the length of the cable 100. The cross member 106 and the jacket 102 together define four cross-sectional quadrants 108, with each quadrant 108 containing one of the four twisted pairs 104. Cross member 106 maintains physical separation between the four twisted pairs 104. Each insulated conductor of a twisted pair 104 comprises a conductive wire 112 (e.g., solid or stranded copper, tin-coated copper, tin-coated copper stranded conductor, aluminum, copper clad steel, copper clad aluminum, etc.), surrounded by a layer of insulation 110. In the example cable 100 depicted in FIG. 1, solid insulation 110 having a circular cross-section (without profiling or air bubbles) is used to insulate the conductive wires 112.

As part of the design of a twisted-pair cable, designers often determine a center-to-center distance between the conductors of a given twisted pair that yields a desired cable impedance and dielectric constant for the pair. The manufacturing process for the cable attempts to maintain this center-to-center distance across the length of the cable. For solid insulation 110, this can be achieved by extruding the insulation coating over each conductive wire 112 such that the cross-sectional radius or thickness of the insulation 110 is consistent along the length of the cable 100.

The electrical and transmission characteristics of each twisted pair 104 can also be tuned by designing air space around the conductors of each twisted pair 104. This can be accomplished using profiled insulation layers having non-circular cross-sections, or using foamed insulation material in which air pockets or bubbles are formed. In general, the geometry and materials used for the insulation layer are key factors in setting important electrical and transmission characteristics of the resulting twisted pair 104, including the impedance, dielectric constant, insertion loss, return loss, signal propagation speed, and other characteristics. By changing the insulation thickness or shape, changing the insulation material, or introducing air or other gases, the performance of the twisted pair 104 can be tuned to achieve desired performance.

Figure 2:
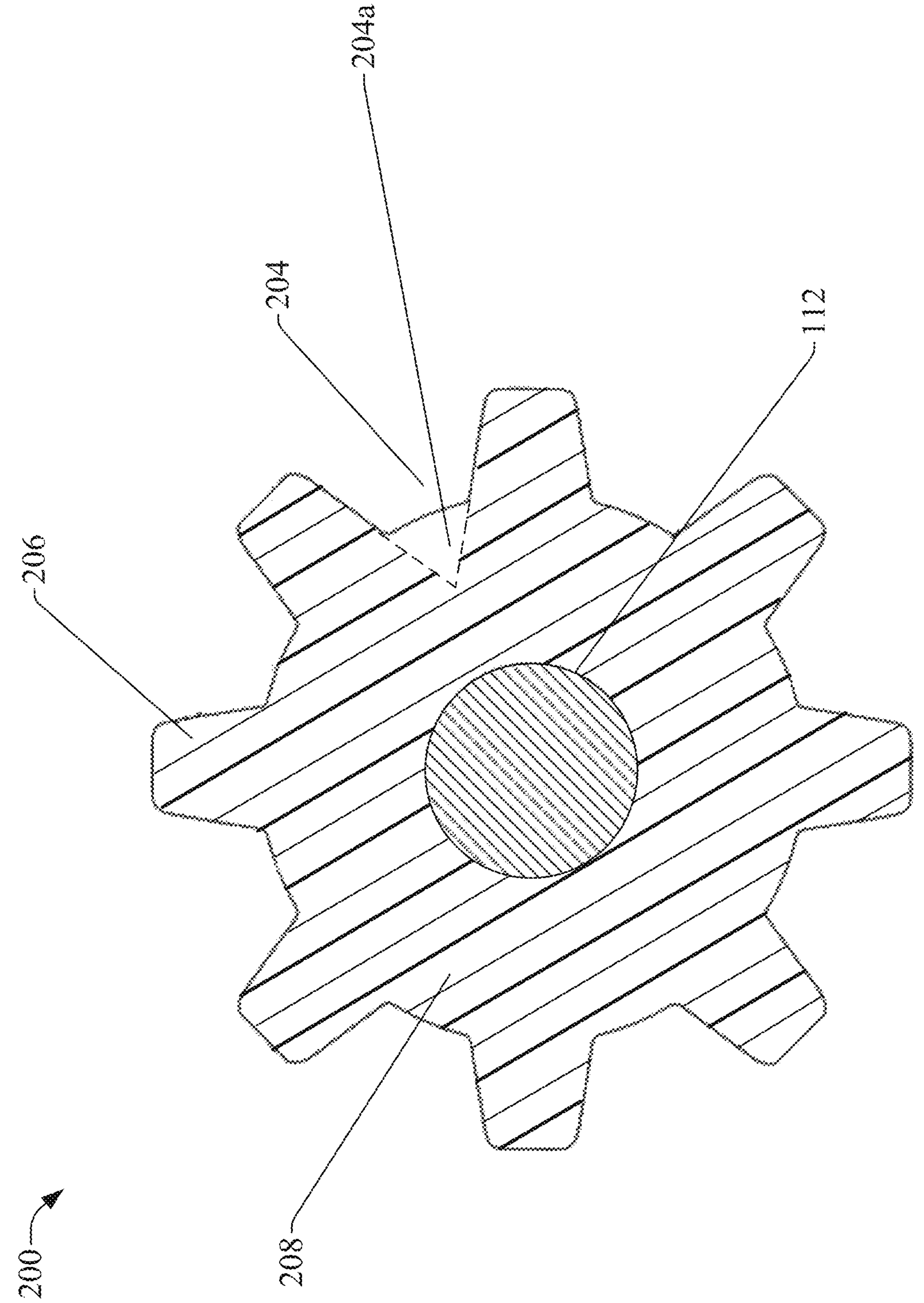
FIG. 2 is a cross-sectional view of an example insulated conductor having a profiled insulation layer surrounding the conductive wire.

FIG. 2 is a cross-sectional view of an example of an individual insulated conductor 200 comprising a profiled insulation layer 208 surrounding the conductive wire 112. In this example, the cross-sectional profile of the insulation layer 208 is substantially gear-shaped, comprising a set of equally spaced peaks 206 formed on the outer surface of the insulation layer 208, with troughs 204 formed between adjacent peaks 206. The peaks 206 are directed away from the conductive wire and extend along the length of the conductive wire 112 such that the longitudinal axis of each peak 206 is substantially parallel to the longitudinal axis of the conductive wire 112. The troughs 204 serve as air channels that introduce air near the conductive wire 112, improving the electrical characteristics of the twisted pair. In some embodiments, the ratio of a first distance from the conductive wire 112 to the top of a peak 206 to a second distance from the conductive wire 112 to the bottom of the peak 206 can be at least 1.1.

Profiled insulation layers 208 can be designed with any number of peaks 206, and with any ratio between the widths of the peaks 206 and the widths of the troughs 204. While the example insulated conductor 200 illustrated in FIG. 2 depicts all peaks 206 as having the same width, some profile designs may comprise peaks 206 having two or more different widths on the same insulation layer 208. Similarly, a given profiled insulation layer 208 may comprise troughs 204 of a single width or may vary the widths of the troughs 204 on the same layer 208. Also, although the example profile depicted in FIG. 2 comprises peaks 206 having rounded trapezoidal shapes, peaks 206 of substantially any shape can be used including, but not limited to, square, rectangular, triangular, rounded, arched, or elliptical peaks. Similarly, while the example profile depicted in FIG. 2 comprises troughs 204 that are relatively flat arches, the toughs 204 can also be substantially any shape. For example, troughs 204 may have a triangular shape that points toward the center of the insulated conductor 200 (as illustrated by the dashed trough 204*a* in FIG. 2) or that points away from the center of the insulated conductor 200. In various designs, the shape of the trough 204 may be similar to, or different from, the shape of the peak 206.

Figure 3:
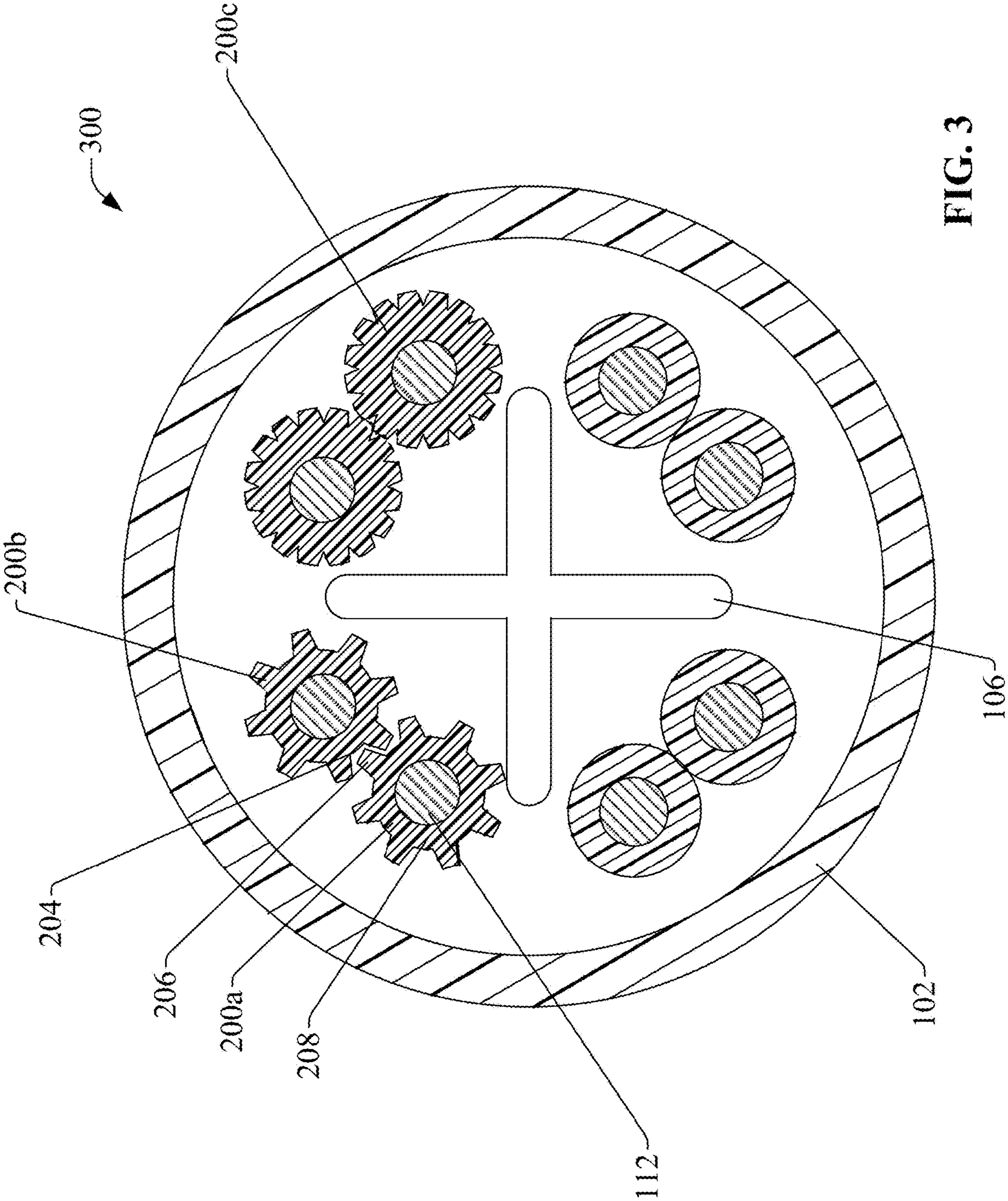
FIG. 3 is a cross-sectional view of an example cable that incorporates profiled insulation for two of its twisted pairs.

There are challenges that complicate the design and manufacture of cables that incorporate profiled insulation. FIG. 3 is a cross-sectional view of an example cable 300 that incorporates profiled insulation for two of its twisted pairs (the upper left and upper right pairs). The upper right twisted pair comprises insulated conductors 200*a* having profiled insulation layers 208 having a cross-sectional shape similar to that illustrated in FIG. 2. As shown in this figure, the relative widths of the peaks 206 and troughs 204 permit a peak 206 of one insulated conductor 200*a* to nest within a trough 204 of the other insulated conductor 200*b* of the pair, if the rotational orientations of the two insulated conductors 200*a*, 200*b* cause the peak 206 to align with the trough 204. This nesting can bring the conductive wires 112 of the pair closer together at the nested locations, reducing the center-to-center distance between the insulated conductors 200*a*, 200*b* relative to the designed center-to-center distance. As a result, this nesting of profiled insulation layers can negatively impact the electrical characteristics of the twisted pair (e.g., the impedance, the insertion loss, the dielectric constant, etc.).

Nesting of adjacent insulated conductors 200 (e.g., 200*a*, 200*b*) can be mitigated by back-twisting or forward-twisting the insulated conductors 200 during the manufacturing process before the pairs are twisted together, causing the peaks 206 to rotate along the lengths of the insulated conductors 200 and preventing the alignment of peaks 206 and troughs 204 that permits nesting. However, this solution can slow the twisting rate of the cable manufacturing operation, increasing the time and labor required to produce the cable 300. As another approach to prevent nesting, the cross-sectional shape of the profiled insulation layer 208 can be designed such that the widths of the peaks 206 are greater than the widths of the troughs 204, as illustrated by insulated conductor 200*c* in FIG. 3. Since the wider peaks 206 cannot fit within the narrower troughs 204, nesting is prevented without the need to back-twist or forward-twist the individual insulated conductors 200. However, this solution requires more insulation material relative to designs similar to that illustrated in FIG. 2, and also limits the amount of air that can be introduced near the conductive wire 112, potentially yielding sub-optimal electrical characteristics.

Figure 4:
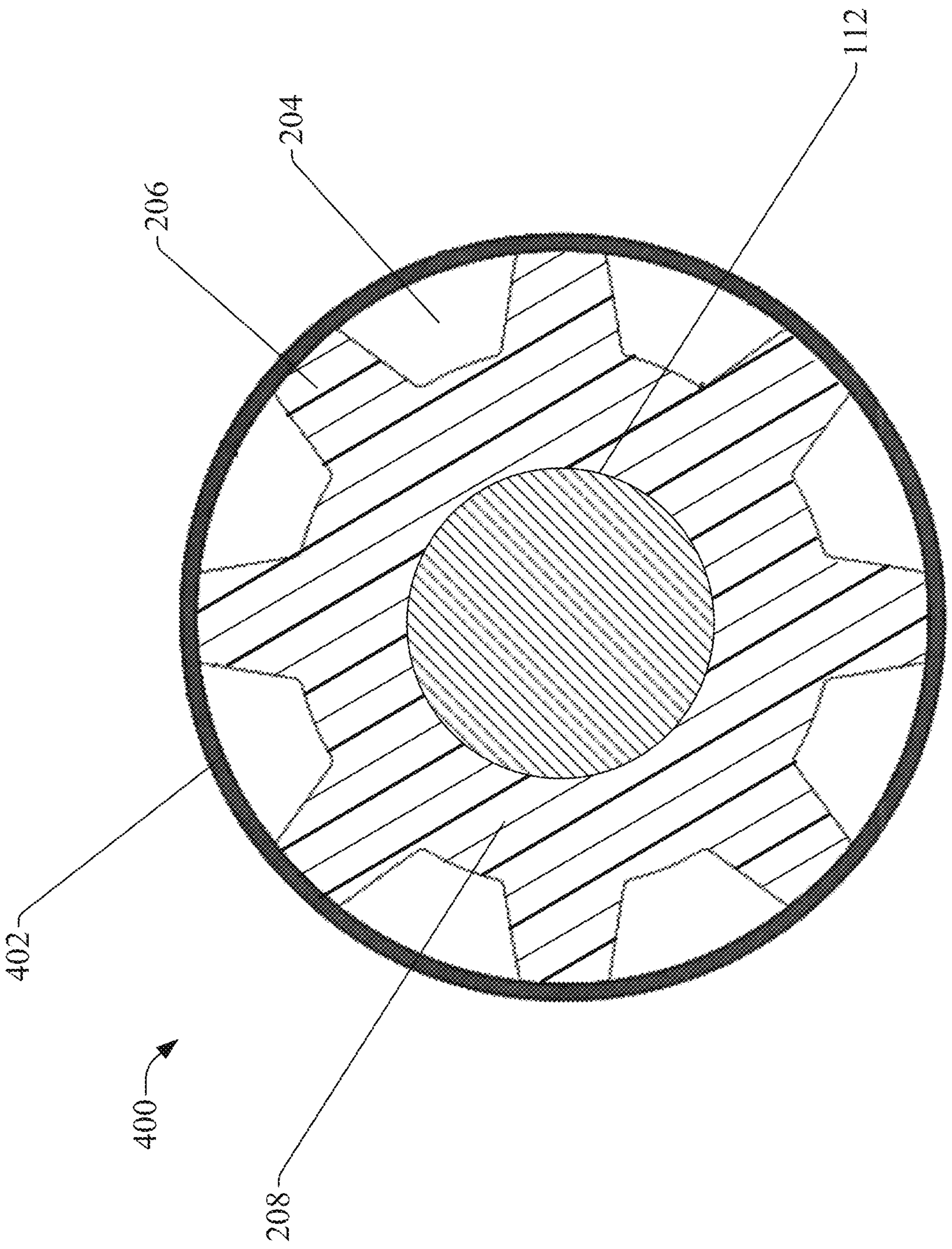
FIG. 4 is a cross-sectional view of a conductor that adds a secondary insulation layer over the primary profiled insulation layer.

According to one or more embodiments described herein, to prevent nesting of the peaks 206 and troughs 204 of profiled insulation layers 208 without the need to back-twist or forward-twist the conductors, while also allowing for a greater range of width ratios between the peaks 206 and troughs 204 of the cross-sectional profile, a thin layer of secondary insulation can be added over the primary profiled insulation layer 208. FIG. 4 is a cross-sectional view of an insulated conductor 400 that adds a secondary insulation layer 402 over the primary profiled insulation layer 208. In this example, the primary insulation layer 208 that surrounds the conductive wire 112 has a cross-sectional shape similar to that illustrated in FIG. 2, with peaks 206 alternating with troughs 204 on the outer surface of the primary profiled insulation layer 208. Additionally, the primary profiled insulation layer 208 is surrounded by a secondary insulation layer 402. The secondary insulation layer 402 contacts the tops of the peaks 206 of the primary layer 208 while leaving the troughs 204 open or unfilled, allowing the troughs 204 to continue serving as air channels near the conductive wire 112.

The secondary insulation layer 402 can be substantially any thickness, or may be designed to have a thickness of a specified ratio to the height of the peaks 206. The ratio of the thickness of the secondary insulation layer 402 to the height of the peaks 206 can be substantially any ratio. For example, this ratio can be less than one (e.g., 1:5) in order to minimize material consumption. Ultimately, this ratio is determined by several factors, including the flexural modulus of the materials used for the secondary insulation layer 402, the tension applied to the insulated conductors during the twisting operation, and the width of the troughs 204. These factors can be taken into consideration in the design to achieve a desired impedance, accounting for deformation of the secondary insulation layer 402 or peaks 206. The primary profiled insulation layer 208 and the secondary insulation layer 402 can comprise any suitable insulation material, including but not limited to polyolefin or fluoropolymer, and may also comprise flame retardant or smoke suppressant additives. The two layers 208 and 402 may comprise the same type of insulation material or two different types of insulation material.

Figure 5:
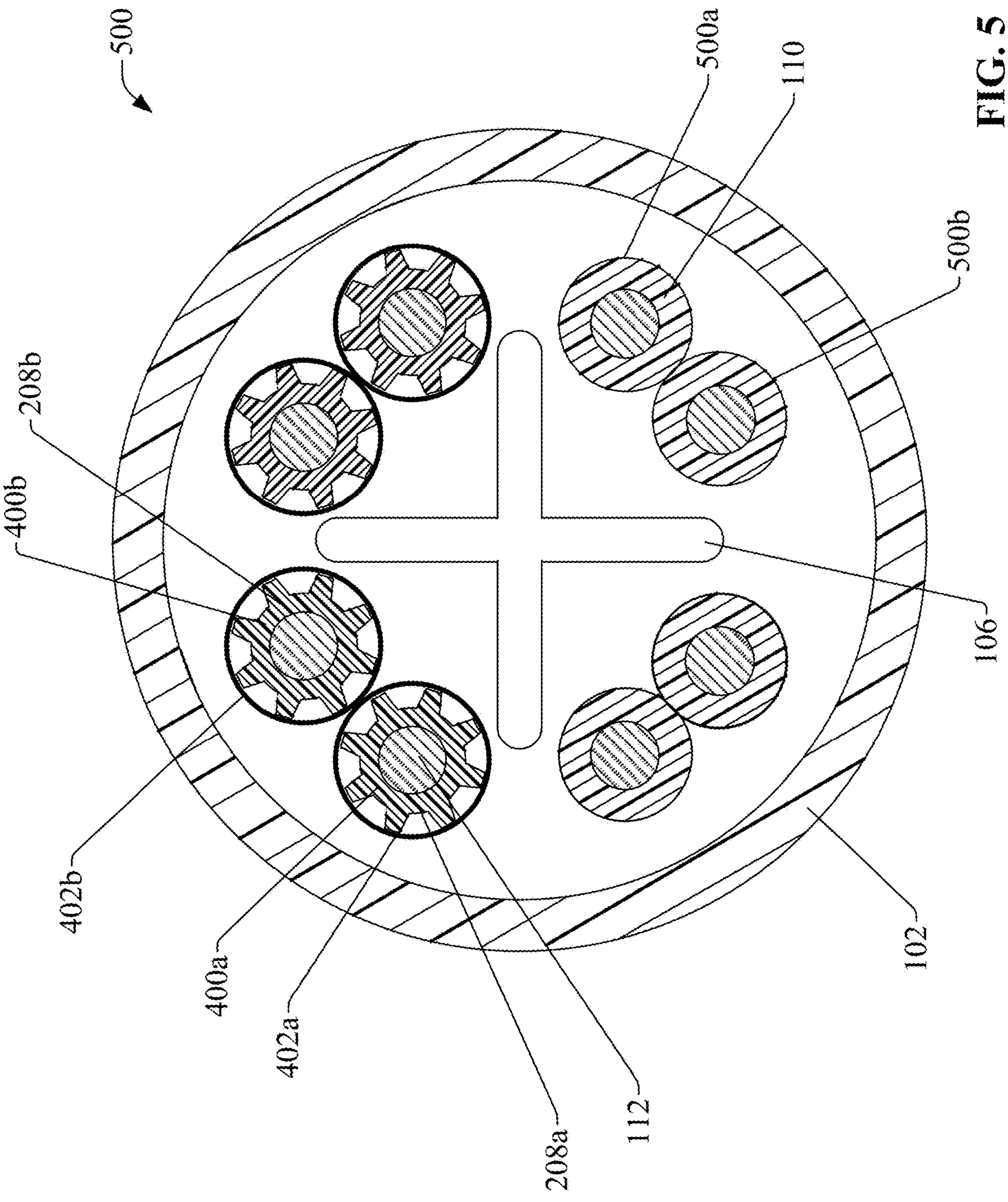
FIG. 5 is a cross-sectional view of an example cable that incorporates the conductor of FIG. 4 for two of its twisted pairs.

FIG. 5 is a cross-sectional view of an example cable 500 that incorporates insulated conductor 400 (e.g., 400*a*, 400*b*) for two of its twisted pairs (the upper left and upper right pairs). When two insulated conductors 400*a* and 400*b*, each having both a primary profiled insulation layer 208*a*, 208*b* and a secondary insulation layer 402*a*, 402*b*, are twinned together as a twisted pair, the secondary insulation layers 402*a* and 402*b* of the two insulated conductors 400*a* and 400*b* make contact with one another and prevent direct contact between the primary profiled insulation layers 208*a* and 208*b*, thereby preventing nesting between the peaks 206 and troughs 204 of profiled insulation layers 208*a* and 208*b* without the need to perform forward-twisting or back-twisting of the individual insulated conductors 400*a*, 400*b*.

In some embodiments, the primary profiled insulation layer 208 and the secondary insulation layer 402 may be made of two different insulation materials. In an example design, since the primary profiled insulation layer 208 has a greater effect on the dielectric constant of the twisted pair, a more expensive material can be used for the primary profiled insulation layer 208, while a less expensive material can be used for the secondary insulation layer 402. This design approach can yield the benefits described above while reducing the manufacturing costs relative to using the same material for both insulation layers.

Also, in some embodiments, the same cable 500 may include twisted pairs that use conductors having different types of insulated profiles. In the example illustrated in FIG. 5, the twisted wire pairs in the upper left and upper right quadrants use insulated conductors 400 (e.g., 400*a*, 400*b*), which each have a primary profiled insulation layer 208 and a secondary insulation layer 402, while the twisted pairs in the lower left and lower right quadrants use insulated conductors 500*a* and 500*b* having a single layer of solid insulation 110 surrounding the copper conductor 112 (similar to the conductors used in cable 100 of FIG. 1). In other embodiments, all twisted pairs of the cable 500 may use insulated conductors 400 (e.g., 400*a*, 400*b*). In such embodiments, all insulated conductors 400 in the cable 500 may use profiled insulation layers 208 having the same cross-sectional shape. Alternatively, cable 500 may comprise insulated conductors 400 with profiled insulation layers 208 having two or more different cross-sectional shapes (e.g., a first subset of twisted pairs may comprise conductors 400 having profiled insulation layers 208 of a first shape (e.g., varying the number of peaks 206, varying the ratio between the widths of the peaks 206 and the widths of the throughs 204), while a second subset of twisted pairs may comprise insulated conductors 400 having profiled insulation layers 208 of a second shape different than that of the first shape). In general, a given cable 500 may comprise any combination of one or more types of insulated conductors for its various twisted pairs.

Figure 6:
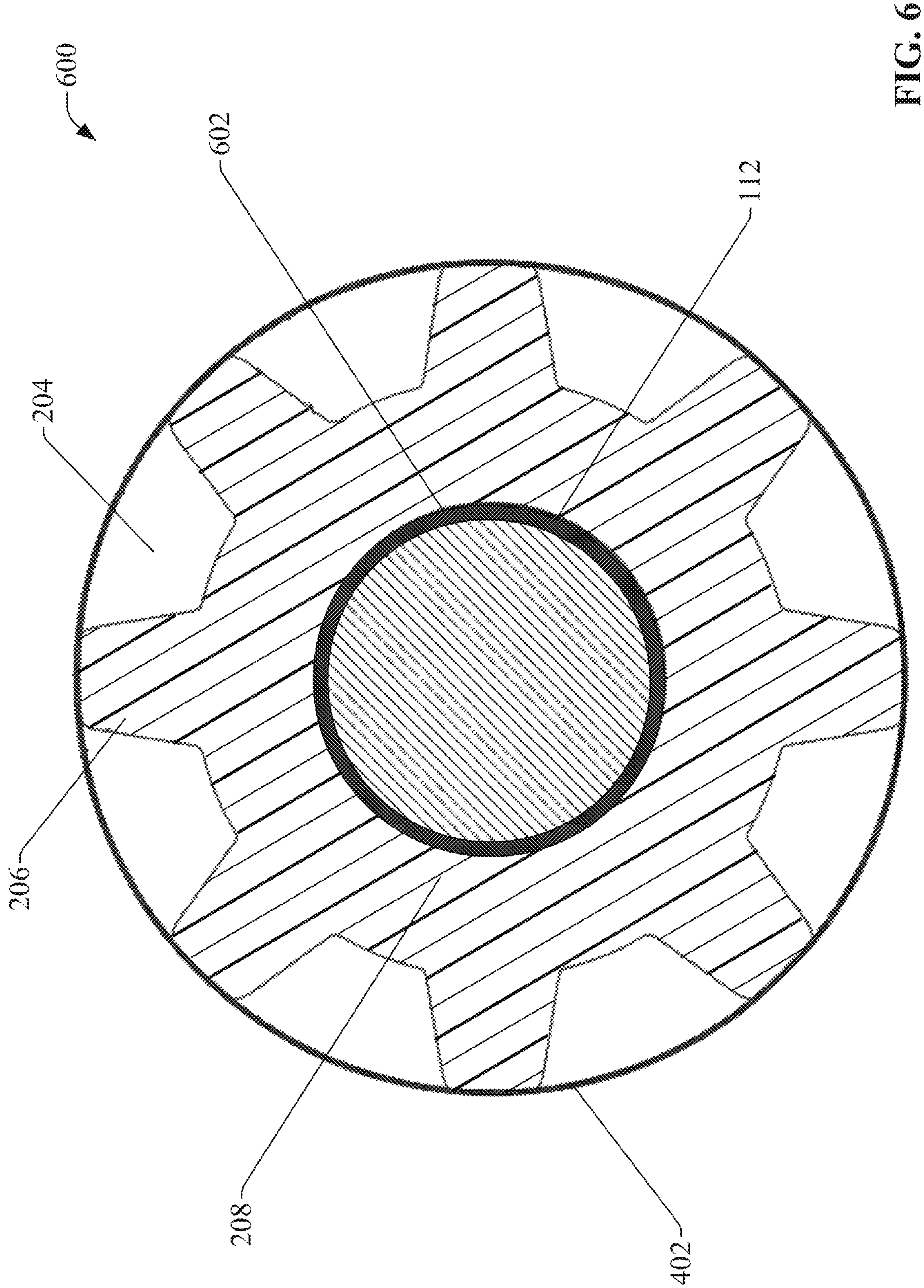
FIG. 6 is a cross-sectional view of a conductor having a primary profiled insulation layer and a secondary insulation layer over the primary profiled insulation layer, as well as a third insulation layer layered between the conductive wire and the primary profiled insulation layer.

Some embodiments may also incorporate more than one additional insulation layer on the same conductor. For example, rather than surrounding the primary profiled insulation layer 208 with a single secondary insulation layer 402, two or more secondary insulation layers 402 may be applied, with a first secondary layer 402 surrounding the primary layer 208 and subsequent secondary layers 402 layered over the first secondary layer 402. In still other embodiments, a third insulation layer may be added between the conductive wire 112 and the primary profiled insulation layer 208. FIG. 6 is a cross-sectional view of an insulated conductor 600 having a primary profiled insulation layer 208 and a secondary insulation layer 402 over the primary profiled insulation layer 208 (similar to insulated conductor 400), as well as a third insulation layer 602 layered between the conductive wire 112 and the primary profiled insulation layer 208. The material used for the third insulation layer 602 may be the same material use for either of the primary insulation layer 208 or the secondary insulation layer 402, or may comprise a different material from those used for either of the layers 208 or 402.

Figure 7:
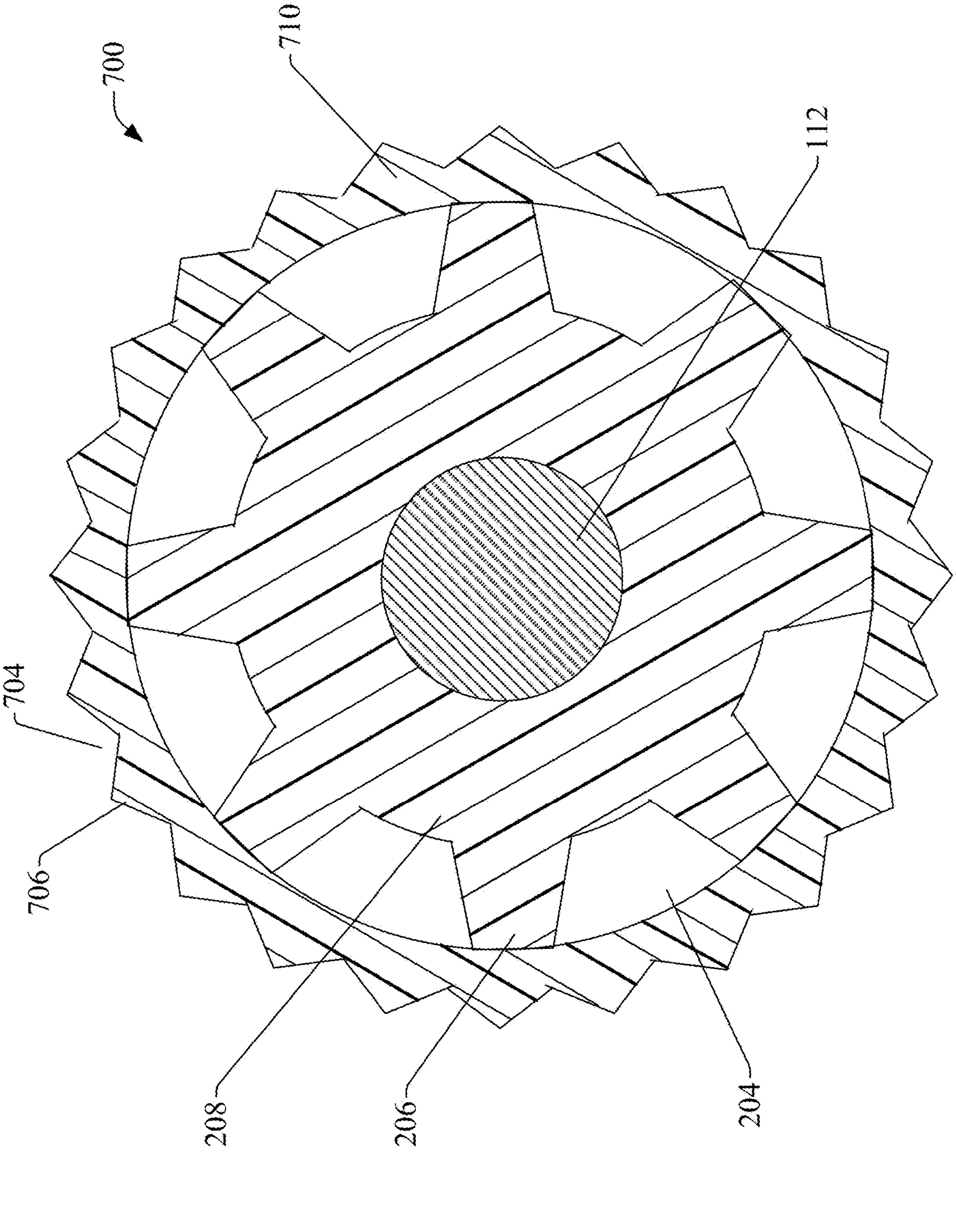
FIG. 7 is a cross-sectional view of an example insulated conductor in which the conductive wire is surrounded by a primary profiled insulation layer, and a secondary profiled insulation layer surrounds the primary profiled insulation layer.

While previous examples have depicted the secondary insulation layer 402 as being a solid non-profiled layer, the secondary insulation layer 402 can be another profiled layer in some embodiments. Moreover, one or both of the primary profiled insulation layer 208 or the secondary insulation layer 402 may be a non-solid insulation material, such as foamed insulation. FIG. 7 is a cross-sectional view of an example insulated conductor 700 in which conductive wire 112 is surrounded by a primary profiled insulation layer 208, and a secondary profiled insulation layer 710 surrounds the primary profiled insulation layer 208. In this example, the primary layer 208 has a similar gear shape to that depicted in FIG. 2 (i.e., peaks 206 having a rounded trapezoidal shape) while the secondary layer 710 has a profile of a different shape, comprising triangular peaks 706 and troughs 704 on its outer surface. The air channels created by the troughs 704 in this example can further tune the electrical characteristics of the twisted pair, thereby providing an additional tuning parameter for the twisted pair.

The example profile shapes depicted in FIG. 7 should not be construed as limiting. In general, embodiments that utilize profiled layers for both the primary insulation layer 208 and the secondary insulation layer 710 can use the same profile shape or respective two different profile shapes (e.g., peaks having different shapes, different numbers of peaks, different width ratios between the peaks and troughs, etc.). Moreover, in any of the example designs described herein, the primary insulation layer 208 and the secondary insulation layer 402, 710 may both be made of a solid insulation material, or may comprise a foamed insulation material for one or both of the primary insulation layer 208 or the secondary insulation layer 402, 710.

Figure 8:
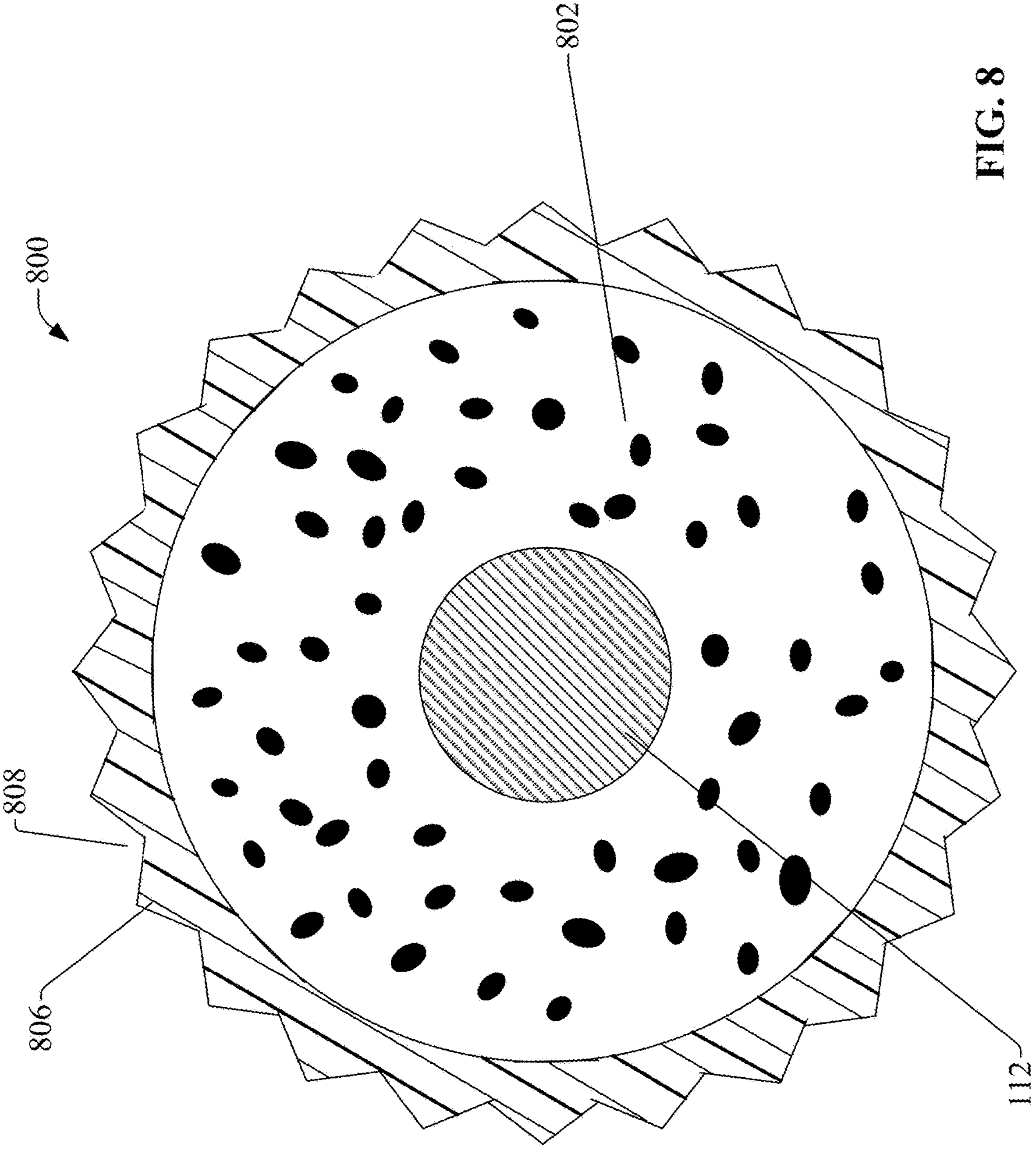
FIG. 8 is a cross-sectional profile of an example conductor in which the conductive wire is surrounded by a non-profiled primary insulation layer, and a profiled secondary layer surrounds the primary insulation layer.

FIG. 8 is a cross-sectional profile of an example insulated conductor 800 according to another embodiment, in which the conductive wire 112 is surrounded by a non-profiled primary insulation layer 802, and a profiled secondary layer 804 surrounds the primary insulation layer 802. In this example, the primary insulation layer 802 is made of a foamed material in which air pockets, depicted as darkened oval portions, are suspended. The air pockets of the primary insulation layer 802 introduce air near the conductive wire 112, improving the electrical and transmission characteristics of the twisted pair that includes the conductor 800. The profiled secondary insulation layer 804 in this example comprises triangular peaks 806 and troughs 808 on its outer surface (although peaks and troughs having other shapes are also within the scope of one or more embodiments).

Substantially any type of manufacturing process can be used to produce the multi-layered conductors described herein. For example, the primary profiled insulation layer 208 and secondary insulation layer (e.g., layers 402, 710, or 804) can be applied via respective two different passes of the conductive wire 112 through a single extruder crosshead (a dual-pass process) or by applying the primary insulation layer 208 using a first extruder crosshead and applying the secondary insulation layer using a second extruder crosshead downstream from the first crosshead (a tandem extrusion). However, faster and more consistent manufacture of the insulated conductors described herein may be achieved by applying both the primary profiled insulation layer 208 and the secondary insulation layer (e.g., layers 402, 710, or 804) at the same time using the same extruder crosshead, with both the primary layer 208 and the secondary layer being added via a single pass through the crosshead. Extrusion using a single extruder crosshead, which applies multiple layers in the same pass through the crosshead, can yield more consistent insulated conductors—with improved concentricity and ovality—relative to tandem extrusion using two separate crossheads. This extrusion approach also allows for various combinations of solid, foamed, and profiled insulation types to be applied to the same conductive wire 112.

The insulation layering approach described herein, whereby a second insulation layer is added over a profiled insulation layer on the same conductor, can allow the number or volume of voids or airspace surrounding the conductive wire to be increased relative to using a single layer of profiled insulation, while preventing nesting of adjacent profiled insulators. This can ensure a consistent center-to-center distance between twisted pairs even if profiled insulation having a low width ratio between peaks and troughs is used as the primary insulation layer.

Figure 9:
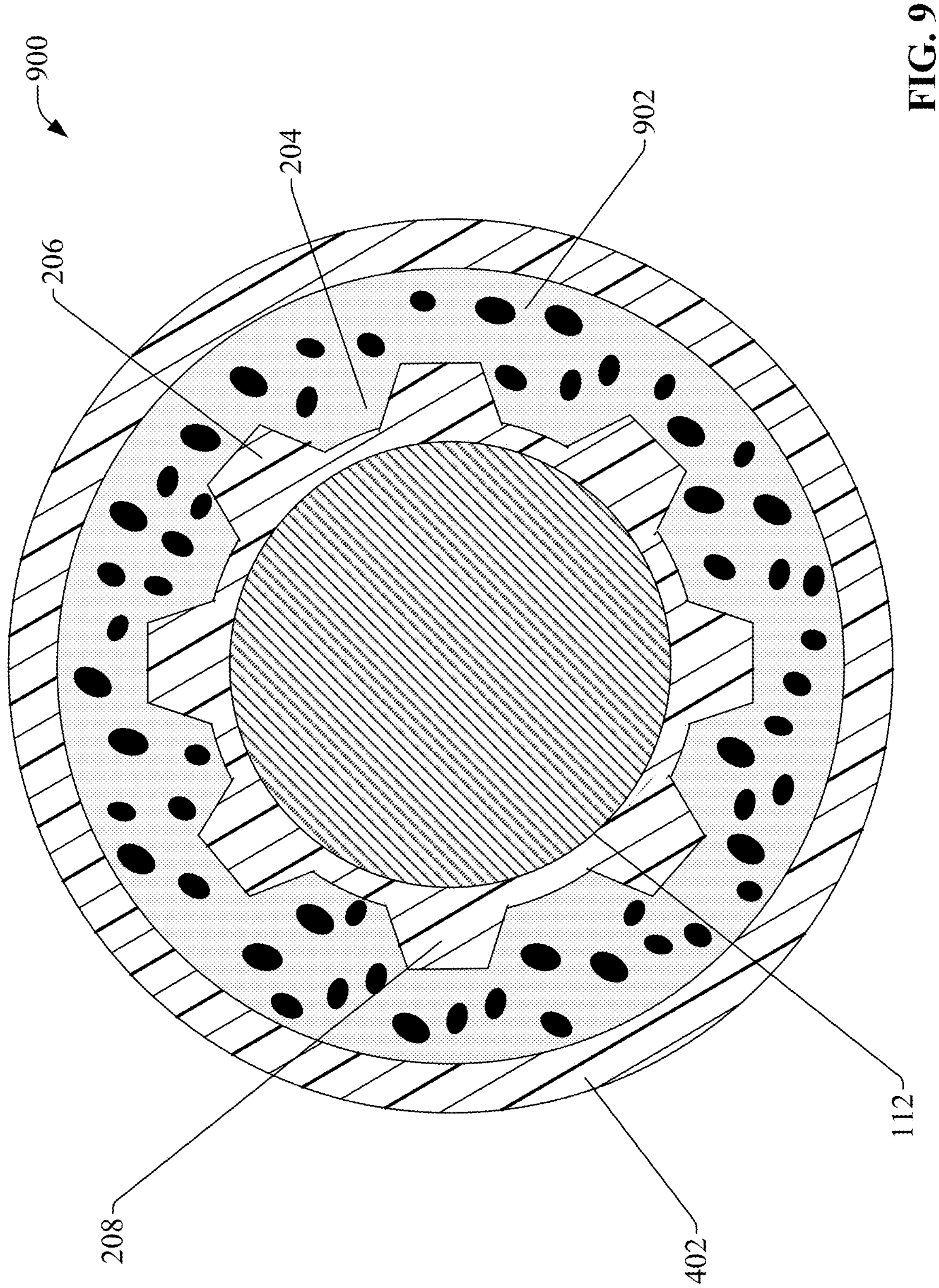
FIG. 9 is a cross-sectional view of an insulated conductor having a solid primary profiled insulation layer formed over a conductive wire, a solid secondary insulation layer having a cross-sectional diameter greater than that of the primary profiled insulation layer, and a foamed insulation layer that fills the volume between the primary profiled insulation layer and the secondary insulation layer.

In some embodiments, rather than applying the secondary insulation layer 402 directly on the primary profiled insulation layer 208 and allowing the troughs 204 of the primary profiled insulation layer 208 to act as air channels, the secondary insulation layer 402 can be sized to have a larger diameter to allow greater space between the secondary insulation layer 402 and the primary insulation layer 208, and the volume between the two layers can be filled with a foamed insulation layer. FIG. 9 is a cross-sectional view of an insulated conductor 900 having a solid primary profiled insulation layer 208 formed over the conductive wire 112, a solid secondary insulation layer 402 having a cross-sectional diameter greater than that of the primary profiled insulation layer 208, and a foamed insulation layer 902 that fills the volume between the primary profiled insulation layer 208 and the secondary insulation layer 402. In this example, rather than adding the secondary insulation layer 402 directly over the primary profiled insulation layer 208 such that the secondary insulation layer 402 makes contact with the peaks 206 of the primary profiled insulation layer 208, the foamed insulation layer 902 is added to the primary profiled insulation layer 208 and the secondary insulation layer 402 is formed over the foamed insulation layer 902, creating a separation between the primary profiled insulation layer 208 and the secondary insulation layer 402 which is filled with the foamed insulation layer 902. As in previous example, the peaks 206 and troughs 204 can have substantially any shape and size, including, but not limited to, square, rectangular, triangular, rounded, arched, or elliptical. Also, although the peaks 206 of the primary insulated layer 208 are depicted as having substantially the same widths, some embodiments of the primary insulated layer 208 may comprise peaks 206 of two or more different widths (e.g., peaks 206 that alternate between longer and shorter widths).

In the configuration depicted in FIG. 9 (and its variants), air pockets or bubbles within the foamed insulation layer 902 ensure that air is introduced near the conductive wire 112, thereby reducing the dielectric constant and loss factor of the insulated conductor 900. The use of foam insulation between the primary profiled insulation layer 208 and the secondary insulation layer 402 can also improve flame and smoke performance of the insulation conductor relative to the use of solid insulation since foam insulation comprises less insulation material than solid insulation.

Figure 10:
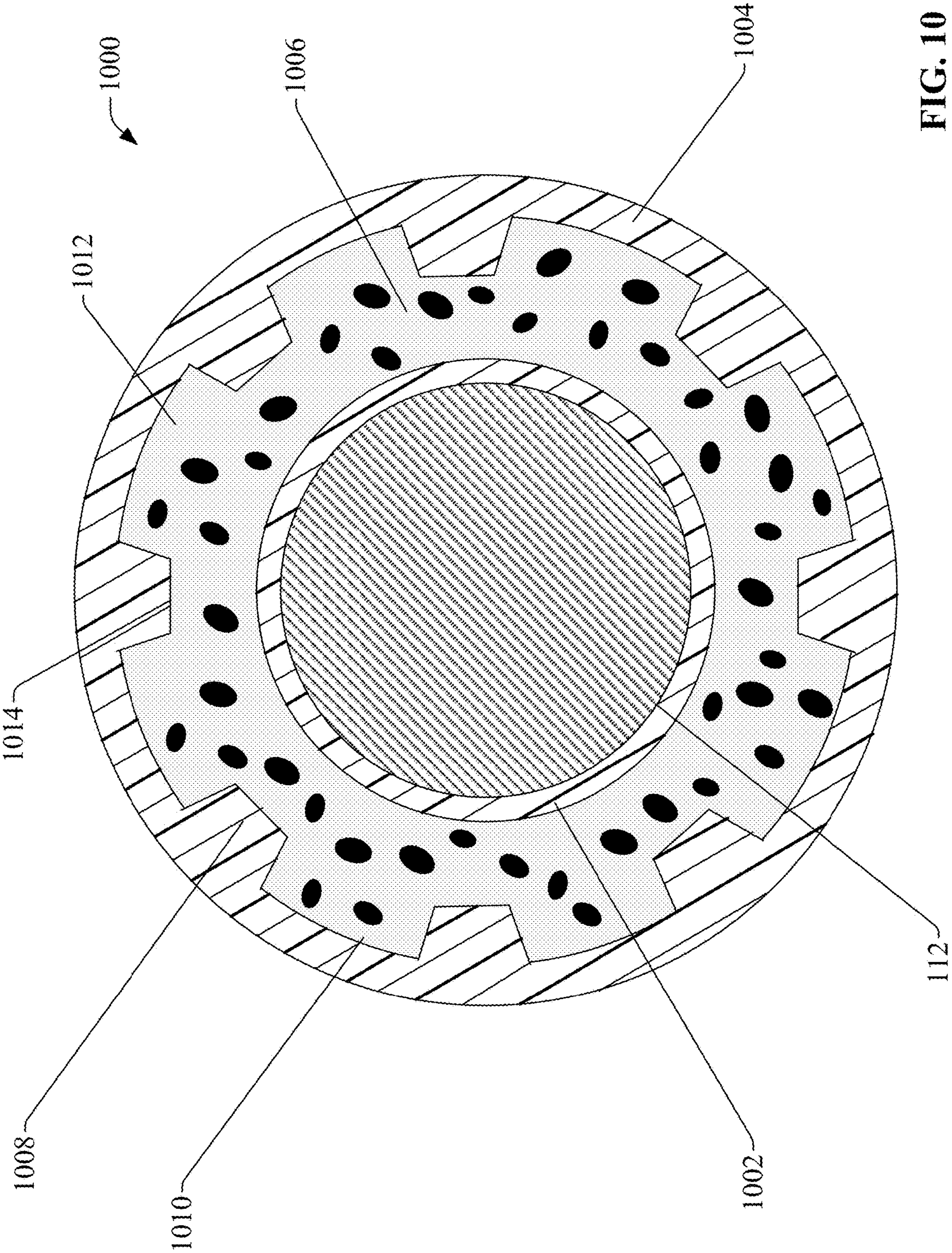
FIG. 10 is a cross-sectional view of an example insulated conductor comprising a solid non-profiled primary insulation layer formed directly on the conductive wire, a solid secondary profiled insulation layer having a cross-sectional diameter greater than that of the primary insulation layer, and a foamed insulation layer that fills the volume between the primary insulation layer and the secondary profiled insulation layer.

FIG. 10 is a cross-sectional view of another example insulated conductor 1000 comprising a solid non-profiled primary insulation layer 1002 formed directly on the conductive wire 112, a solid secondary profiled insulation layer 1004 having a cross-sectional diameter greater than that of the primary insulation layer 1002, and a foamed insulation layer 1006 that fills the volume between the primary insulation layer 1002 and the secondary profiled insulation layer 1004. In this example, the cross-sectional profile of the secondary insulation layer 1004 comprises peaks 1008 formed on the interior surface of the secondary profiled insulation layer 1004 and directed toward the conductive wire 112, with the peaks 1008 alternating with troughs 1010 formed between the peaks 1008. Since the foamed insulation layer 1006 fills the space between the primary insulation layer 1002 and the secondary profiled insulation layer 1004, the outward-facing surface of the foamed insulation layer 1006 comprises peaks 1012 having a shape corresponding to that of the troughs 1010 of the secondary profiled insulation layer 1004, and troughs 1014 having a shape corresponding to that of the peaks 1008 of the secondary profiled insulation layer 1004.

As in previously described examples, the various peaks and toughs of the secondary profiled insulation layer 1004 can have substantially any shape or width. Moreover, the secondary profiled insulation layer 1004 may comprise peaks 1008 having two or more different shapes or widths.

Also, although the example embodiment illustrated in FIG. 10 depicts the peaks 1008 and troughs 1010 of the secondary profiled insulation layer 1004 being formed on the internal surface of the secondary profiled insulation layer 1004, in some embodiments the peaks and troughs of the secondary profiled insulation layer 1004 may be formed on the exterior surface of the secondary profiled insulation layer 1004 instead of, or in addition to, the interior surface.

Figure 11:
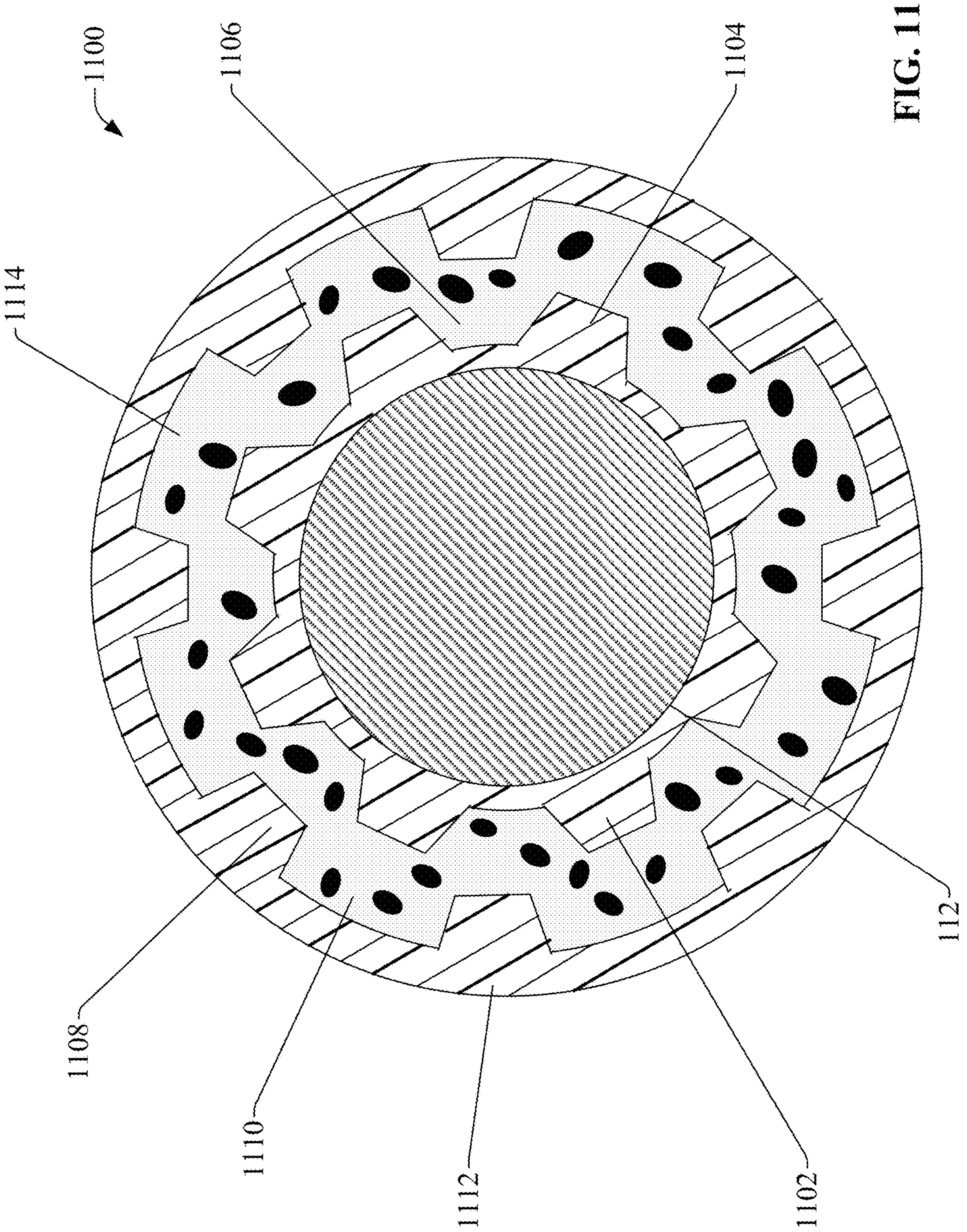
FIG. 11 is a cross-sectional view of an example insulated conductor comprising a solid profiled primary insulation layer formed directly on the conductive wire, a solid secondary profiled insulation layer having a cross-sectional diameter greater than that of the primary profiled insulation layer, and a foamed insulation layer that fills the volume between the primary profiled insulation layer and the secondary profiled insulation layer.

FIG. 11 is a cross-sectional view of another example insulated conductor 1100 comprising a solid profiled primary insulation layer 1102 formed directly on the conductive wire 112, a solid secondary profiled insulation layer 1112 having a cross-sectional diameter greater than that of the primary profiled insulation layer 1002, and a foamed insulation layer 1114 that fills the volume between the primary profiled insulation layer 1102 and the secondary profiled insulation layer 1112. In this example, the primary profiled insulation layer 1102 comprises peaks 1104 on its outward-facing surface directed away from the conductive wire 112, with the peaks 1104 alternating with and troughs 1106. The secondary profiled insulation layer 1112 is similar to the secondary insulation layer 1004 described above in connection with FIG. 10, comprising peaks 1108 formed on its interior surface and directed toward the conductive wire 112, with the peaks 1108 alternating with troughs 1110 formed between the peaks 1108 (it is to be appreciated, however, that the secondary profiled insulation layer 1112 may comprise peaks and troughs formed on its exterior surface rather than, or in addition to, its interior surface without departing from the scope of one or more embodiments).

In the example depicted in FIG. 11, the peaks 1108 of the secondary profiled insulation layer 1112 substantially align with the troughs 1106 of the primary profiled insulation layer 1102. However, the primary profiled insulation layer 1102 and secondary profiled insulation layer 1112 may have any rotational orientation relative to one another without departing from the scope of one or more embodiments, including orientations in which the peaks 1108 of the secondary profiled insulation layer 1112 are offset from the troughs 1106 of the primary profiled insulation layer 1112 such that the peaks 1108 and troughs 1106 are not aligned with one another. Moreover, as in previously described examples, the secondary profiled insulation layer 1112 may comprise peaks 1108 of two or more different shapes or widths. Similarly, the primary profiled insulation layer 1102 may comprise peaks 1104 of two or more different shapes or widths. Also, the shapes of the peaks 1104 of the primary profiled insulation layer 1102 may be different than the shapes of the peaks 1108 of the secondary profiled insulation layer 1112.

The profiled insulation layers of any of the embodiments described herein can be formed or applied using any suitable manufacturing technique. For example, the peaks and troughs of the various profiled insulation layers can be formed as part of the extrusion processes, or can be formed via removal of material from initially non-profiled layers to yield the profiled insulation layers.

Figure 12:
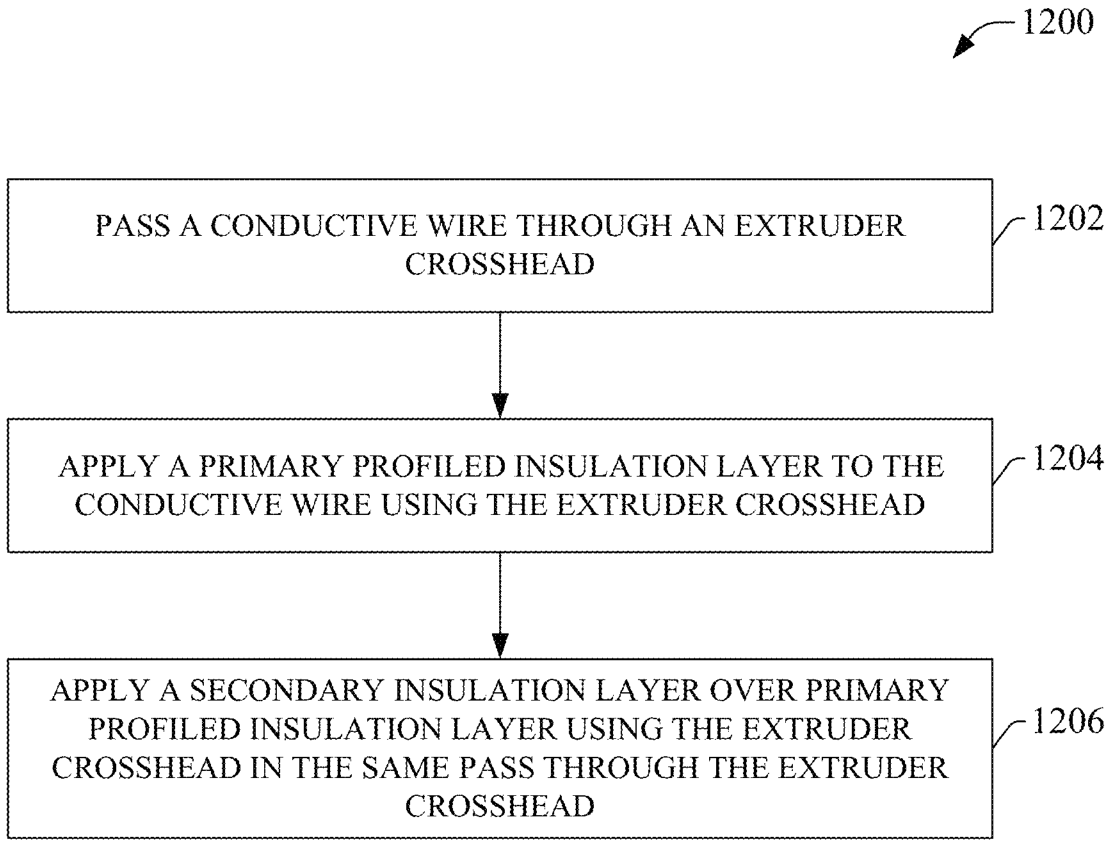
FIG. 12 is a flowchart of an example methodology for fabricating an insulated conductor for a data cable in which the conductor comprises at least a primary profiled insulation layer and a secondary insulation layer.

FIG. 12 illustrates a methodology in accordance with one or more embodiments of the subject application. While, for purposes of simplicity of explanation, the methodology shown herein are described as a series of steps, it is to be understood and appreciated that the subject innovation is not limited by the order of steps, as some steps may, in accordance therewith, occur in a different order and/or concurrently with other steps from that shown and described herein. For example, those skilled in the art will understand and appreciate that a methodology could alternatively be represented as a series of interrelated states or events, such as in a state diagram. Moreover, not all illustrated steps may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 12 illustrates an example methodology 1200 for fabricating an insulated conductor for a data cable in which the conductor comprises at least a primary profiled insulation layer and a secondary insulation layer. Initially, at 1202, a conductive wire is passed through an extruder crosshead. At 1204, during the pass through the crosshead, a primary profiled insulation layer is applied to the conductive wire by the extruder crosshead. The profiled insulation layer can conform to substantially any cross-sectional profile shape, including but not limited to gear-shaped cross-sections having peaks and troughs of substantially any size, shape, and relative widths. The profiled insulation layer may comprise a solid insulation material, a foamed insulation material, or another type of material. At 1206, a secondary insulation layer is applied by the extruder crosshead over the primary profiled insulation layer during the same pass through the crosshead. The secondary insulation layer may comprise the same material as the primary layer or a different material and may be a non-profiled layer or a second profiled layer. In the latter case, the profile of the second layer may have a different cross-sectional shape from that of the primary layer or may conform to the same cross-sectional shape as the primary layer. In the case of profiled secondary insulation layers, the profiling may be formed on either the outward-facing surface or the inward-facing surface of the secondary insulation layer. Also, in some embodiments, a step may be added to apply a foam insulation layer that fills the space between the primary profiled insulation layer and the secondary insulation layer. In other variations of methodology 1200, the primary profiled insulation layer applied at step 1204 may instead be a non-profiled insulation layer, with the secondary insulation layer applied at step 1206 being a profiled layer.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A data conductor, comprising:

a first insulation layer applied to a conductive wire, the first insulation layer having a first profiled cross-sectional shape;

a second insulation layer having a cross-sectional diameter greater than that of the first insulation layer and having a second profiled cross-sectional shape; and a foamed insulation layer that fills a volume between the first insulation layer and the second insulation layer, wherein the first profiled cross-sectional shape of the first insulation layer comprises first peaks formed on an exterior surface of the first insulation layer, and the second profiled cross-sectional shape of the second insulation layer comprises second peaks formed on an interior surface of the second insulation layer and directed toward the conductive wire.

2. The data conductor of claim 1, wherein the second peaks of the profiled cross-sectional shape have respective longitudinal axes that are substantially parallel to a longitudinal axis of the conductive wire, and troughs are formed between the second peaks.

3. The data conductor of claim 2, wherein the second peaks or the troughs are at least one of trapezoidal, rectangular, square, triangular, rounded, arched, or elliptical.

4. The data conductor of claim 1, wherein at least one of the first insulation layer or the second insulation layer comprises a foamed insulation material.

5. The data conductor of claim 1, wherein the first insulation layer comprises a first insulation material, and the second insulation layer comprises a second insulation material.

6. The data conductor of claim 1, wherein the data conductor is a component of a twisted pair of data conductors of a data cable.

7. A method, comprising:

applying a first layer of insulation to a conductive wire, wherein the first layer of insulation has a first profiled cross-sectional shape;

applying a second layer of insulation having a cross-sectional diameter greater than that of the first layer of insulation and a second profiled cross-sectional shape around the first layer of insulation; and filling a volume between the first layer of insulation and the second layer of insulation with a layer of foamed insulation, wherein the first profiled cross-sectional shape of the first layer of insulation comprises first peaks formed on an exterior surface of the first layer of insulation, and the second profiled cross-sectional shape comprises second peaks formed on an interior surface of the secondary layer of insulation layer and directed toward the conductive wire.

8. The method of claim 7, wherein at least one of the first layer of insulation or the second layer of insulation comprises a foamed insulation material.

9. The method of claim 7, further comprising applying a third layer of insulation between the conductive wire and the first layer of insulation.

10. The method of claim 7, wherein the applying of the first layer of insulation and the applying of the second layer of insulation are performed by a same extruder crosshead during a same pass of the conductive wire through the extruder crosshead.

11. A conductor of a data cable, comprising:

a conductive wire;

a first insulation layer surrounding the conductive wire and having a first profile cross-sectional shape comprising first peaks formed on an outward-facing surface of the first insulation layer;

a second insulation layer surrounding the first insulation layer, wherein the second insulation has a greater cross-sectional diameter than the first insulation layer and has a second profiled cross-sectional shape comprising second peaks formed on an interior surface of the second insulation layer and directed toward the conductive wire; and a foamed insulation layer that fills a volume between the first insulation layer and the second insulation layer.

12. The conductor of claim 11, wherein the first peaks and the second peaks have respective longitudinal axes that are substantially parallel to a longitudinal axis of the conductive wire.

13. The conductor of claim 11, wherein the first insulation layer comprises a first insulation material, and the second insulation layer comprises a second insulation material.

14. The conductor of claim 11, wherein the first peaks or the second peaks are at least one of trapezoidal, rectangular, square, triangular, rounded, arched, or elliptical.

15. The data conductor of claim 11, wherein at least one of the first peaks or the second peaks comprise peaks having two or more different shapes.

16. The data conductor of claim 11, wherein the second peaks substantially align with troughs between the first peaks.

17. The data conductor of claim 1, wherein the second peaks substantially align with troughs between the first peaks.

18. The data conductor of claim 1, wherein at least one of the first peaks or the second peaks comprise peaks having two or more different shapes.

19. The method of claim 7, wherein the second peaks substantially align with troughs between the first peaks.

20. The method of claim 7, wherein at least one of the first peaks or the second peaks comprise peaks having two or more different shapes.

* * * * *